May 28, 1963  D. B. ARCHER  3,091,634
RECOVERY OF NAPHTHENIC ACIDS
Filed Oct. 29, 1959
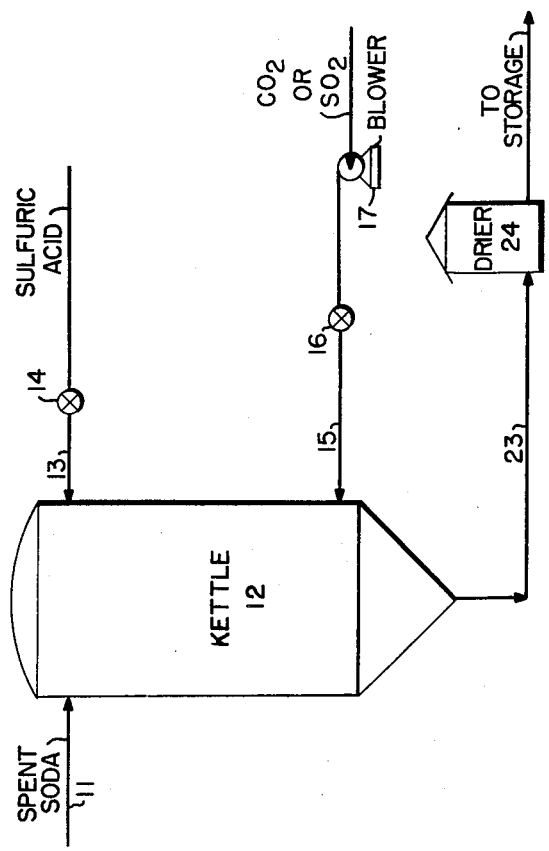
Douglas Bastow Archer  Inventor
By *Richard N. Nagel*
Attorney United States Patent Office 3,091,634
Patented May 28, 1963

3,091,634
RECOVERY OF NAPHTHENIC ACIDS
Douglas Bastow Archer, Barrancabermeja, Colombia, assignor to Esso Research and Engineering Company, a corporation of Delaware
Filed Oct. 29, 1959, Ser. No. 849,671
9 Claims. (Cl. 260—514)

This invention relates to a novel process for the recovery of organic carboxylic acid and particularly naphthenic acids.

Naphthenic acids are found in naphthenic base crude oils, particularly those obtained from California, Colombia, Venezuela, Rumania, Russia, etc. The naphthenic acids are conventionally recovered by treating the crude petroleum oil or fractions thereof with aqueous solutions of alkalies such as caustic soda to form sodium naphthenates which are soluble in the aqueous solutions. The aqueous solutions are then separated from the petroleum oil and treated with mineral acids such as sulfuric, hydrochloric, etc., to regenerate and separate the crude naphthenic acids.

Naphthenic acids are utilized extensively in the production of paint driers, emulsifying agents, textiles and wood preservative agents and gelling agents. There is, therefore, a distinct need for improved, economic processes for recovering naphthenic acids.

The present invention provides an improved method for obtaining high grade naphthenic acids from naphthenate solutions by a process more economical than hitherto practiced. The method comprises contacting an aqueous solution of alkalimetal naphthenates with an acidic gas and in particular carbon dioxide or sulfur dioxide, separate or in combination with each other, at atmospheric pressure, to convert a portion of the naphthenates to naphthenic acids. Normally, this "springing" of naphthenic acids from the spent caustic employed to scrub the diesel oil and kerosene oil fractions containing the naphthenic acids involves treatment thereof with mineral acids and in particular sulfuric acid. The use of these acids represents a substantial cost item. In accordance with the present invention, a substantial part of the "springing" is obtained by use of these acid gases found in many waste refinery streams; the balance of the regeneration or recovery of naphthenic acid from the naphthenate being accomplished by conventional acid treatment.

The naphthenic acids released from the alkalimetal naphthenates by the treatment with acid gases form in combination with other compounds, a separate phase distinct from the original aqueous phase. This phase, containing the free naphthenic acids, also contains a concentration of unsaponifiable matter which will be greater than that remaining in the aqueous phase. The distribution of unsaponifiable matter in the two phases will depend upon several factors including the intensity of the treatment with the acid gases and the time allowed for the separation of the two phases.

The inorganic aqueous naphthenates treated with the sulfur dioxide or carbon dioxide are those obtained by the extraction of the naphthenic acids from petroleum or fractions thereof with aqueous alkalimetal hydroxides or their carbonates and bicarbonates, or mixtures thereof. Because of cost considerations, the sodium naphthenates are usually employed.

For the purpose of the present invention there may be employed carbon dioxide of any desired purity. Thus flue gases from refinery units and streams or from any combustion furnaces may be compressed and employed to blow the naphthenate solution. Similarly sulfur dioxide from any desired source may be employed. With the use of these gases, the amount of additional acid treatment to recover completely the naphthenic acids is cut down extensively.

Any mineral acid may be used, such as sulfuric acid or hydrochloric acid or acids which have been used in other processes provided they do not contain impurities which would render the naphthenic acids unsuitable for the uses for which they were intended.

The present invention can be better understood by reference to the flow diagram shown in the drawing.

With the reference to the drawing, spent soda from a conventional naphthenic acid extraction is discharged into kettle 12 through line 11. Kettle 12 is provided with line 13 controlled by a valve 14 through which sulfuric acid may be introduced and line 15 controlled by valve 16 through which the acid gas may be introduced. Blower 17 brings the gas to the desired pressure. The pressure within the naphthenic acid regeneration zone is maintained at atmospheric pressure and the temperature between 10° C. and 100° C. The acid gas is passed through the spent soda solution until the desired effect has been obtained. The volume of gas and time of blowing will be dependent upon the composition of the acid gas, the concentration of the spent soda solution, the amount of free alkalinity and temperature.

Thereafter sulfuric acid is admitted through line 13. Agitation may be provided, if desired, by air blowing or by mechanical means. The regenerated naphthenic acids and resultant aqueous phase may be separated in the kettle 12 and the aqueous phase drawn off through line 23. The recovered naphthenic acid may then be treated in kettle 12 by water washing and air drying or the acid may be transferred through line 23 to another vessel 24 for subsequent treatment or storage.

This invention will be better understood by reference to the following examples of the recovery of naphthenic acids according to the process of this invention.

EXAMPLE 1

A refinery plant test was carried out wherein there was discharged to the test 200 barrels of spent soda resulting from treating kerosene with 5% caustic soda spent to 90%. This soda was diluted in equal proportions with water to increase the volume and to separate some unsaponifiable matter. The soda was blown with compressed flue gas for 48 hours and a sample thereof showed a 10% separation of a dark oily layer above the water layer. The water layer contained 10% available naphthenic acid as compared to 14% available in the original charge. After 64 hours of air blowing, the naphthenic acid content of the water layer dropped to 8%. Since further blowing resulted in no further decrease in naphthenic acid content of the water layer, the latter was drawn off and two layers acidified separately with sulfuric acid. Table I includes the results obtained.

Table I

DATA OBTAINED FROM BLOWING SPENT SODA WITH CARBON DIOXIDE

[All figures based on 100 bbls. of spent soda]

|  | Spent Soda Charged | Upper Phase [2] | Lower Phase |
|---|---|---|---|
| Volume in barrels | 100 | 10 | 90 |
| Bbls. of $H_2SO_4$ required for neutralization | 1.65 | 0.309 | 0.819 |
| Naphthenic acids produced (Bbls.) | 14 | 6.7 | 7.2 |
| Bbls. $H_2SO_4$ consumed per bbl. of naphthenic acid (98% strength) | 0.118 | 0.046 | 0.114 |
| Naphthenic Acid Quality: |  |  |  |
| Acid Number "A"[1] | 269.3 | 239 | 281.5 |
| Acid Number "B"[1] | 282.1 | 275.3 | 288.1 |
| Percent unsaponifiables | 4.51 | 13.06 | 2.3 |
| Corrosion | Pass | Pass | Pass |

[1] Acid Number "A" is the acid number of the naphthenic acid as recovered. Acid Number "B" is the acid number of the naphthenic acids after removal of the unsaponifiable matter.

[2] This phase showed an acid number of 72.6 before treatment with sulfuric acid.

These data show that by neutralizing both the upper and lower layer following the carbon dioxide blowing a saving of 31% of the sulfuric acid required for the original soda is realized.

A further advantage of the present invention lies in the fact that operating in accordance with the present invention there is obtained a separation of the naphthenic acids into fractions with different acid numbers. This is normally difficult to do economically.

The following data illustrate the separation of acids, obtained in this test:

Table II

| Blowing Time With Flue Gas | Acid Number of Naphthenic Acids Recovered | | |
|---|---|---|---|
|  | Original Soda | Upper Phase | Lower Phase |
| 0 | 259.3 |  |  |
| 64 hours |  | 243 | 275 |
| 80 hours |  | 241 | 278 |
| 85 hours |  | 239 | 281.5 |

EXAMPLE 2

A laboratory test was carried out using 1000 ml. of spent soda resulting from the treatment of diesel fuel oil with 10% caustic soda spent to 90%. This soda was then blown with compressed commerical carbon dioxide from a cylinder. Blowing was continued until equilibrium had been reached which was indicated by a supernatant phase attaining constant volume. The supernatant phase was separated from the lower aqueous phase and each neutralized separately with sulfuric acid in order to recover the naphthenic acids. Table III includes the results obtained from this test.

Table III

DATA OBTAINED FROM BLOWING SPENT SODA WITH CARBON DIOXIDE

[All figures based on 1000 ml. of spent soda]

|  | Spent Soda Charged | Upper Phase | Lower Phase |
|---|---|---|---|
| Volume in ml | 1,000 | 563 | 437 |
| Ml. of $H_2SO_4$ required for neutralization (98% strength) | 43.0 | 19.8 | 22.2 |
| Naphthenic Acids Produced (ml.) | 388.0 | 375.0 | 7.3 |
| Ml. $H_2SO_4$ consumed per ml. of naphthenic acid | 0.111 | 0.053 | 3.03 |
| Naphthenic Acid Quality: |  |  |  |
| Acid Number "A"[1] | 197.0 | 195.8 | 278.5 |
| Acid Number "B"[1] | 231.5 | 227.6 | 279.1 |
| Percent Unsaponifiables | 15.0 | 14.0 | 0.21 |
| Corrosion | Pass | Pass | Pass |

[1] Refer to Table I for the significance of these values.

These data show that by discarding the lower or aqueous phase and neutralizing the upper phase with sulfuric acid, that 46% of the sulfuric acid required to neutralize the original spent soda would be required, and 96.6% of the naphthenic acids available in the original spent soda would be recovered at approximately the same acid number level. However, this test also illustrates the separation of naphthenic acids into fractions of different acid numbers.

EXAMPLE 3

Sulfur dioxide being a stronger acid than carbon dioxide, was of greater advantage as a naphthenic acid "springing" agent, particularly in conjunction with sulfuric acid. It has been found that with prolonged blowing with $SO_2$ the naphthenic acids are almost completely "sprung," as shown by the following data:

[Based on 100 barrels of spent soda]

|  | Treatment with $H_2SO_4$ | Prior Treatment with $SO_2$ |
|---|---|---|
| $H_2SO_4$ Required barrels | 2.8 | 0.19 |
| Yield of Naphthenic Acids do | 27 | 25.5 |
| Acid No. of Naphthenic Acids | 219.2 | 219.1 |
| Corrosion Test | Pass | Pass |

The saving on the amount of sulfuric acid necessary to complete the "springing" of the naphthenic acid as a function of time of blowing with $SO_2$ is clearly illustrated in the following table:

[Based on 100 barrels of spent soda]

| Blowing Time with $SO_2$, Minutes | $H_2SO_4$ Required to Spring Completely the Naphthenic Acids, barrels |
|---|---|
| 0 | 2.8 |
| 10 | 2.7 |
| 20 | 2.3 |
| 30 | 2.1 |
| 40 | 1.8 |
| 50 | 1.2 |

It is to be understood that the invention is not limited to the specific examples, which have been offered merely as illustrations, and that modifications may be made in equipment and conditions within the ranges specified without departing from the spirit of this invention.

What is claimed is:

1. A process for recovering naphthenic acids from aqueous solutions containing alkali metal naphthenates derived from the treatment of petroleum crude oil and distillates fractionated from the crude oil which consists essentially of contacting said aqueous solutions with an acid gas selected from the group consisting of $CO_2$ and $SO_2$ at atmospheric pressure to liberate a substantial portion of said naphthenates as naphthenic acid and thereafter adding a mineral acid to complete the liberation of the naphthenic acids.

2. The process of claim 1 wherein the treatment of said aqueous solution with said acid gas causes the formation of two phases which phases are separated and treated separately with mineral acid to recover naphthenic acids from each of the two phases.

3. The process of claim 1 wherein said acid gas is carbon dioxide.

4. The process of claim 1 wherein said acid gas is sulfur dioxide.

5. The process of claim 2 wherein the treatment of the aqueous naphthenate solution with $CO_2$ causes the formation of two phases which are separated and individually treated with mineral acid to recover naphthenic acids possessing different acid numbers by varying the period of time which the $CO_2$ is bubbled there through and separating the acids with the desired acid numbers.

6. The process of claim 2 whereby naphthenic acids possessing different acid numbers may be obtained by varying the period of time which said gas is contacted with said aqueous solution of alkali metal naphenates.

7. The process of recovering naphthenic acids from aqueous solutions containing alkali metal naphthenates derived from the treatment of petroleum distillates fractionated from crude oil which consists essentially of contacting said aqueous solution of alkali metal naphthenates with $CO_2$ gas at atmospheric pressure to liberate a substantial portion of said naphthenates as naphthenic acids which acids form a phase separate from said aqueous solution, separating the two phases and separately treating each of the phases with a mineral acid to complete the liberation of naphthenic acids from each of the separated phases.

8. The process of recovering naphthenic acids from aqueous solutions consisting essentially of alkali metal naphthenates derived from the treatment of petroleum distillates fractionated from crude oil which consists essentially of contacting said aqueous solution of alkali metal naphthenates with $SO_2$ gas at atmospheric pressure to liberate a substantial portion of said naphthenates as naphthenic acids which acids form a phase separate from said aqueous solution, separating the two phases and separately treating each of the phases with a mineral acid to complete the liberation of naphthenic acids from each of the separated phases.

9. The process of claim 8 wherein $SO_2$ is contacted with the aqueous solution containing alkali metal naphthenates until there is no longer any conversion of naphthenates to naphthenic acids, whereby the liberated naphthenic acids form a phase distinct from the aqueous solution and the two phases are separated and only the naphthenic acid phase is treated with the mineral acid to complete the conversion of naphthenates to naphthenic acids.

References Cited in the file of this patent
UNITED STATES PATENTS

| | | |
|---|---|---|
| 2,277,315 | Galstaun | Mar. 24, 1942 |
| 2,324,467 | Brandt et al. | July 20, 1943 |
| 2,424,158 | Fuqua et al. | July 15, 1947 |
| 2,537,576 | Dunlap | Jan. 9, 1951 |
| 2,789,134 | Nelson et al. | Apr. 16, 1957 |